US011287025B2

(12) United States Patent
Rakuff et al.

(10) Patent No.: US 11,287,025 B2
(45) Date of Patent: Mar. 29, 2022

(54) COOLING UNITS FOR TRANSMISSIONS

(71) Applicant: ABB Schweiz Ag, Baden (CH)

(72) Inventors: Stefan Rakuff, Windsor, CT (US); Joe J. Liou, Windsor, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/730,372

(22) Filed: Dec. 30, 2019

(65) Prior Publication Data
US 2020/0208732 A1    Jul. 2, 2020

Related U.S. Application Data

(60) Provisional application No. 62/786,839, filed on Dec. 31, 2018.

(51) Int. Cl.
*F16H 57/04* (2010.01)
*F16H 57/02* (2012.01)

(52) U.S. Cl.
CPC ......... *F16H 57/0416* (2013.01); *F16H 57/02* (2013.01); *F16H 57/0452* (2013.01)

(58) Field of Classification Search
CPC .. F16H 57/04; F16H 57/0416; F16H 57/0415; F16H 57/0452; F16H 57/03; F16H 57/031; F16H 57/02; H02K 9/14; H02K 9/06
See application file for complete search history.

(56) References Cited

U.S. PATENT DOCUMENTS

| | | | |
|---|---|---|---|
| 1,991,618 A | 2/1935 | Lyman |
| 2,583,751 A | 1/1952 | Schmitter |
| 3,476,177 A | 11/1969 | Potzl |
| 3,550,678 A | 12/1970 | Pfouts |
| 4,022,272 A | 5/1977 | Miller |
| 4,074,590 A | 2/1978 | Jorg |
| 4,414,861 A | 11/1983 | Witt |
| 5,193,415 A | 3/1993 | Massel |
| 5,579,830 A | 12/1996 | Giammaruti |
| 5,816,320 A | 10/1998 | Arnold et al. |
| 6,210,042 B1 | 4/2001 | Wang et al. |
| 6,415,855 B2 | 7/2002 | Gerard et al. |
| 6,425,293 B1 | 7/2002 | Woodroffe et al. |
| 6,691,831 B1 | 2/2004 | Furuya |

(Continued)

FOREIGN PATENT DOCUMENTS

| | | |
|---|---|---|
| DE | 102004022863 | 12/2005 |
| EP | 0623767 | 11/1994 |

(Continued)

OTHER PUBLICATIONS

Marto, P. J., "An analytical and experimental investigation of rotating, noncapillary heat pipes," 1973, NASA Contractor Report CR-130373, Washington, D. C.. Sep. 1, 1973, 60 pgs. Sep. 1, 1973.

*Primary Examiner* — Luis A Gonzalez
(74) *Attorney, Agent, or Firm* — Leydig, Voit & Mayer, Ltd.

(57) ABSTRACT

Transmissions and methods therefor are disclosed herein. A transmission includes a housing, an input shaft, and a cooling unit. The input shaft extends outside of the housing and is configured to receive rotational power from a rotational power source. The cooling unit is supported by the input shaft. The cooling unit includes a heat exchanger.

19 Claims, 2 Drawing Sheets

(56) References Cited

U.S. PATENT DOCUMENTS

| | | |
|---|---|---|
| 6,761,546 B2 | 7/2004 | Schlipf et al. |
| 6,919,504 B2 | 7/2005 | McCutcheon et al. |
| 7,231,767 B2 | 6/2007 | Whiting |
| 7,443,062 B2 | 10/2008 | Dong et al. |
| 7,569,955 B2 | 8/2009 | Hassett et al. |
| 7,687,945 B2 | 3/2010 | Martin et al. |
| 8,410,350 B2 | 4/2013 | Corrales et al. |
| 8,833,193 B2 | 9/2014 | Straub et al. |
| 8,967,334 B2 | 3/2015 | Straub et al. |
| 8,973,458 B2 | 3/2015 | Straub et al. |
| 9,062,754 B2 | 6/2015 | Straub et al. |
| 9,599,406 B2 | 3/2017 | Tietyen et al. |
| 9,856,759 B2 | 1/2018 | Schiedig et al. |
| 9,951,859 B2 | 4/2018 | Becka |
| 10,058,008 B2 | 8/2018 | Yang |
| 10,260,817 B2 | 4/2019 | Fetzer et al. |
| 10,458,534 B1 | 10/2019 | Liou et al. |
| 2005/0151554 A1 | 7/2005 | Rae et al. |
| 2009/0038780 A1* | 2/2009 | Liu .................. H01L 21/4882 165/104.28 |
| 2015/0289850 A1 | 10/2015 | Lewis et al. |
| 2015/0296658 A1* | 10/2015 | Kimura .............. F16H 57/0416 361/697 |
| 2018/0299210 A1 | 10/2018 | Ronacher |
| 2019/0368502 A1 | 12/2019 | Rakuff et al. |
| 2019/0368595 A1 | 12/2019 | Liou et al. |
| 2019/0368596 A1 | 12/2019 | Rakuff et al. |

FOREIGN PATENT DOCUMENTS

| | | | |
|---|---|---|---|
| JP | 2002218704 A | * | 8/2002 |
| JP | 3757765 | | 3/2006 |
| WO | 9104427 | | 4/1991 |

* cited by examiner

COOLING UNITS FOR TRANSMISSIONS

CROSS-REFERENCE TO RELATED APPLICATION

The present application claims the benefit of the filing date of U.S. Provisional Application Ser. No. 62/786,839 filed on Dec. 31, 2018, which is incorporated herein by reference.

TECHNICAL FIELD

The present invention generally relates to transmissions, and more particularly, but not exclusively, to transmissions including gear reducers.

BACKGROUND

Prolonging the service life of transmissions and associated components remains an area of interest. Some existing devices, systems, and/or methods have various shortcomings in certain applications. Accordingly, there remains a need for further contributions in this area of technology.

SUMMARY

One embodiment of the present invention is a unique transmission including a cooling unit. Other embodiments include apparatuses, systems, devices, hardware, methods, and combinations for cooling transmission components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
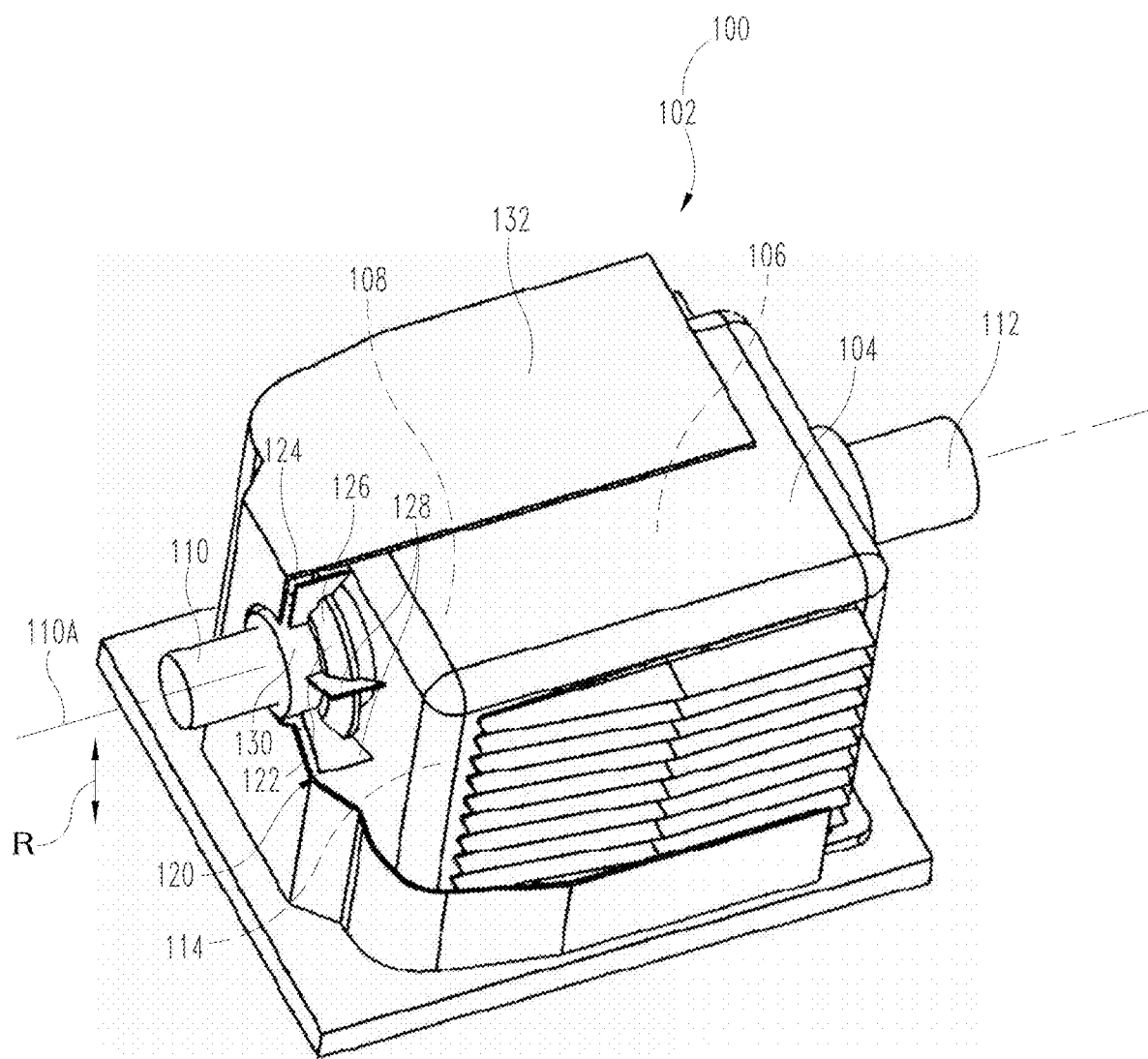
FIG. 1 is a cut-away perspective view of a transmission.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. While illustrative embodiments of the invention are described below, in the interest of clarity, not all features of an actual implementation of the invention may be described herein.

Referring now to FIG. 1, in the illustrative embodiment, a transmission 100 incorporates, or is otherwise adapted for use with, a cooling unit 120. The cooling unit 120 and methods therefor exemplify one embodiment of the present disclosure. It should be appreciated that in the interest of simplicity and/or clarity, one or more features of the illustrative transmission 100 may be depicted schematically in FIG. 1 and/or omitted entirely. Moreover, it should be appreciated that certain features of the illustrative transmission 100, such as one or more shafts, gears, bearings, covers, fans, fasteners, oil etc., for example, may not be depicted in FIG. 1.

In the illustrative embodiment, the transmission 100 includes the cooling unit 120 supported by an input shaft 110 of the transmission 100, which extends outside of a housing 104 of the transmission 100 and is configured to receive rotational power from a rotational power source (e.g., an electric motor). The cooling unit 120 includes a heat exchanger 122 configured to dissipate heat generated by at least one heat source (e.g., one of the components 114, 130 described below) coupled to the input shaft 110 in use of the transmission 100. The heat exchanger 122 is further configured for rotation about an axis 110A defined by the input shaft 110 to draw air into the transmission 100 in use thereof.

The illustrative heat exchanger 122 is embodied as, or otherwise includes, a fan 124. The fan 124 includes a central hub 126 configured for rotation about the axis 110A and blades 128 extending outwardly from the central hub 126. Each of the blades 128 has a planar shape and extends in a radial direction indicated by arrow R away from the axis 110A. The blades 128 are oriented in the radial direction R to facilitate radial airflow during both clockwise and counterclockwise rotation of the central hub 126 about the axis 110A in use of the transmission 100. In some embodiments, the central hub 126 and the blades 128 may cooperate to move or displace substantially the same amount of air during clockwise and counterclockwise rotation of the central hub 126 and the blades 128 about the axis 110A in use of the transmission 100.

In the illustrative embodiment, each of the blades 128 extends in the radial direction R away from the axis 110A without twisting. Put another way, each of the blades 128 is free of any twists, bends, and/or curves such that each of the blades 128 is substantially flat.

In the illustrative embodiment, the central hub 126 is coupled to the input shaft 110 to minimize thermal contact resistance, and thereby improve heat transfer, between the central hub 126 and the input shaft 110. As discussed below, the fan 124 is illustratively formed from one or more materials having a relatively-high thermal conductivity to facilitate dissipation of heat generated by a bearing 130 supported by the input shaft 110.

The illustrative fan 124 is formed from a cast aluminum alloy having a relatively-high thermal conductivity. More specifically, the fan 124 is illustratively formed from one of the following: a 195 series cast aluminum alloy, a 319 series cast aluminum alloy, and a 356 series cast aluminum alloy. In some embodiments, the fan 124 may be formed from a 6000 series aluminum alloy, such as a 6061 series aluminum alloy, for example. In such embodiments, the aluminum alloy may be formed from a casting or forging technique. In other embodiments, however, the aluminum alloy may be formed from, or otherwise include, a billet material.

Of course, it should be appreciated that in other embodiments, the fan 124 may be formed from another suitable material having a relatively-high thermal conductivity. In some embodiments, the fan 124 may be formed from a cast copper-zinc alloy, for example.

The illustrative bearing 130 may support the central hub 126 of the fan 124 for rotation with, and/or relative to, the input shaft 110 in use of the transmission 100. In any case, the central hub 126 is coupled to the input shaft 110 by the bearing 130. In some embodiments, the bearing 130 may be embodied as, or otherwise include, a bushing-type bearing such as the Baldor Taper-Lock® bearing, for example. In such embodiments, the bearing 130 may be formed from an aluminum alloy and include at least one anodized surface. Additionally, in some embodiments, the bearing 130 may include at least one surface treated with thermally conductive grease. It should be appreciated that surface anodization and/or surface treatment with thermally conductive grease minimizes thermal contact resistance and thereby improves conductive heat transfer between the bearing 130 and the fan 124 in use of the transmission 100.

Of course, it should be appreciated that in other embodiments, other treatments and/or mechanisms may be employed to provide additional heat transfer interfaces between the bearing 130 and the central hub 126 to increase heat transfer therebetween. For example, a splined or keyed connection between the bearing 130 and the central hub 126 may be employed to provide increased surface area contact between those components compared to other configurations. In such embodiments, an internal spline or key may be formed in one of the bearing 130 and the central hub 126, and an external spline or keyway may be formed in the other of the bearing 130 and the central hub 126.

In addition to the fan 124, the illustrative cooling unit 120 includes a shroud 132 (a portion of which is cut-away in FIG. 1) that extends around the fan 124 and the housing 104. It should be appreciated that rotation of the fan 124 moves or displaces air in the radial direction R away from the axis 110A in use of the transmission 100. The illustrative shroud 132 is shaped to conduct air across the housing 104 in use of the transmission 100. More specifically, the illustrative shroud 132 is shaped to redirect air moved in the radial direction R by the fan 124 in an axial direction indicated by arrow A toward fins 234 (see FIG. 2) extending outward from the housing 104 to facilitate dissipation of heat generated by at least one heat source (e.g., at least one of the components 114, 130) in use of the transmission 100.

In the illustrative embodiment, the transmission 100 may be embodied as, include, or otherwise be adapted for use with, a gear reducer 102. The housing 104 may define an interior space 106 and a sump 108 configured to store lubricating fluid (e.g., oil) in use of the gear reducer 102. Components 114 may be arranged in the housing 104 (e.g., in the interior space 106) and configured to cooperatively transmit rotational power between the input shaft 110 and an output shaft 112 of the gear reducer 102 to reduce a rotational speed of the output shaft 112 relative to a rotational speed of the input shaft 110 in use of the gear reducer 102. In use thereof, at least one of the components 114 may be supplied with lubricating fluid stored by the sump 108. It should be appreciated, of course, that the components 114 may include, or otherwise be embodied as, structures that cooperate to transmit rotational power between the input shaft 110 and the output shaft 112, such as shafts, sleeves, bearings, gears, pinions, idlers, clutches, brakes, guides, brackets, rods, or the like, for example. Moreover, it should be appreciated that in other embodiments, the transmission 100 may be embodied as, include, or otherwise be adapted for use with, another suitable device.

A radial heat exchanger fan (e.g., the fan 124) may be installed on the high-speed shaft (e.g., the input shaft 110) of the transmission (e.g., the transmission 100) as shown in FIG. 1. The planar blades (e.g., the blades 128) of the fan may be oriented along the radial direction (e.g., the direction R) to permit use of the transmission in the clockwise and counterclockwise directions without changing the amount of radial airflow generated by the fan.

The fan may also function as a heat exchanger ("heatsink") between the high-speed shaft and the surrounding air volume to dissipate heat from the high speed pinion bearing (e.g., the bearing 130) and other heat sources (e.g., the components 114) coupled to the high speed shaft. For this reason, the fan may be made of a material with a relatively high thermal conductivity while also fulfilling mechanical strength requirements. A suitable fan material for high volume manufacturing, mechanical strength, and heat conduction may be a cast aluminum or a cast copper-zinc alloy.

The connection between the fan hub (e.g., the central hub 126) and the shaft may be designed to minimize the thermal contact resistance. A possible embodiment may be the Baldor Taper-Lock® design, anodized aluminum surfaces, and surfaces treated with thermally conductive grease.

Figure 2:
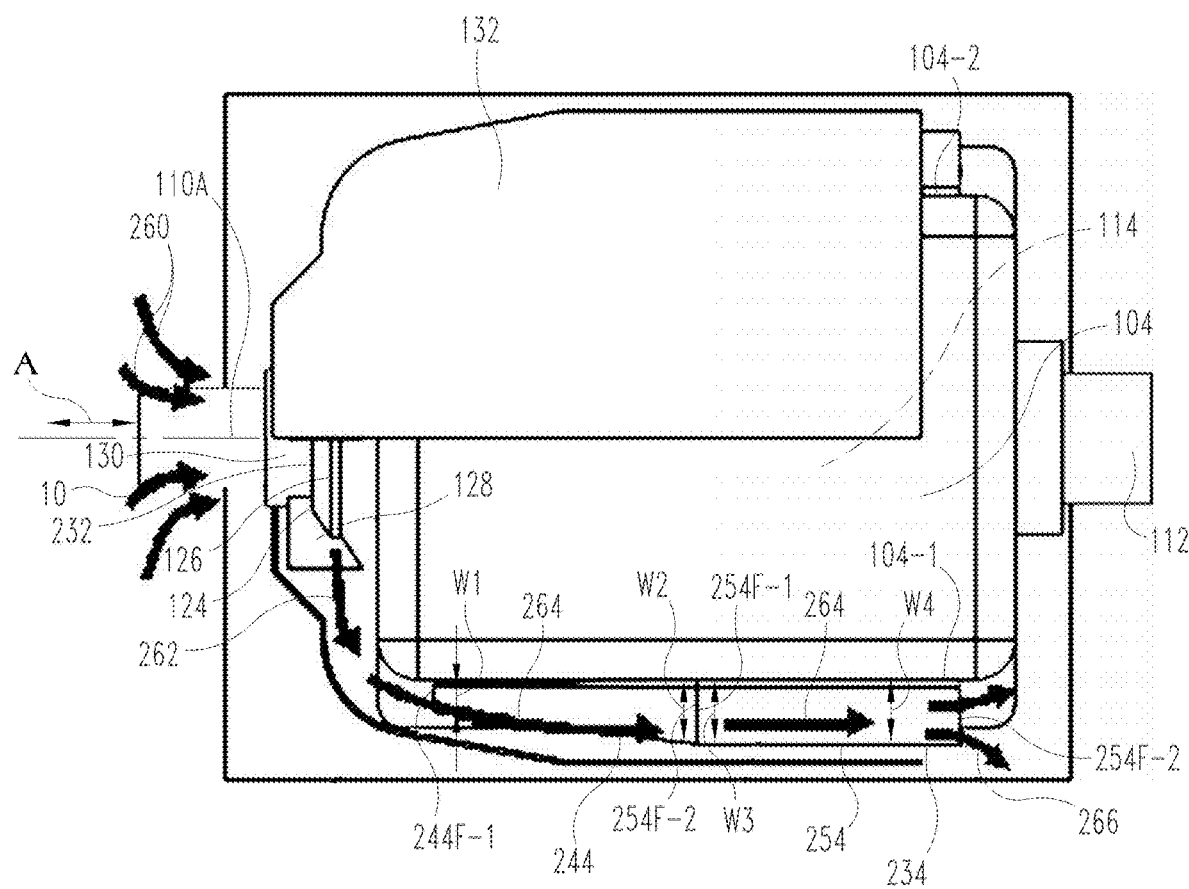
FIG. 2 is a top view of the transmission of FIG. 1, with airflow across the transmission depicted by arrows.

Referring now to FIG. 2, dimensions of the fins 234 are depicted with greater clarity. The fins 234 include a column of fins 244 and a column of fins 254 arranged axially (i.e., in the axial direction A) aft of the column of fins 244. In the illustrative embodiment, the fins 234 include only two columns of fins that extend outward from a face 104-1 of the housing 104 and only two columns of fins (not shown) that extend outward from a face 104-2 of the housing 104 that is arranged opposite the face 104-1. Of course, it should be appreciated that in other embodiments, the fins 234 may include another suitable number of fin columns that extend outward from the faces 104-1, 104-2.

In the illustrative embodiment, each fin 234 of the column of fins 244 extends from an end 244F-1 to an end 244F-2 arranged axially aft of the end 244F-1. Each fin 234 of the column of fins 244 has a width W1 adjacent the end 244F-1 and a width W2 adjacent the end 244F-2. As best seen in FIG. 2, the width W1 is smaller than the width W2.

In the illustrative embodiment, each fin 234 of the column of fins 254 extends from an end 254F-1 to an end 254F-2 arranged axially aft of the end 254F-1. Each fin 234 of the column of fins 254 has a width W3 adjacent the end 254F-1 and a width W4 adjacent the end 254F-2. As best seen in FIG. 2, the width W3 is equal to the width W4. Moreover, as been seen in FIG. 2, the width W3 is about equal, the same, or substantially the same as the width W2.

Operation of the illustrative transmission 100 will now be described with reference to FIG. 2. In use of the transmission 100, rotation of the fan 124 about the axis 110A draws air into the shroud 132 through an opening 232 formed therein as indicated by arrows 260. Rotation of the blades 128 about the axis 110A moves air in the radial direction R as indicated by arrow 262 away from the axis 110A. Air moved in the radial direction R is redirected by the shroud 132 in the axial direction A as indicated by arrows 264 across the housing 104 and over the fins 234. Air moved over the fins 234 may be discharged, vented, or otherwise expelled to the ambient as suggested by arrows 266. Movement of air along the shroud 132 and over the fins 234 dissipates heat generated by at least one of the components 114 and the bearing 130 via convective heat transfer.

The shroud (e.g., the shroud 132) may be shaped to direct axial and/or radial airflow from the fan towards a set of fins (e.g., the fins 234) as shown in FIG. 2. The shroud may be an injection molded plastic component or a sheet metal assembly or stamping that rests on a base plate to close off the bottom part. The shroud may have an opening (e.g., the opening 232) on the left to enable cool ambient intake air to reach the fan. The shroud may then redirect the radial air flow from the fan towards a bank of fins. The cross section of the channel formed between the shroud and the reducer housing may first decrease and then expand to accelerate and then decelerate the airflow from the fan. Expanding and slowing the airflow over the fins may increase heat transfer by convection. Hot air may be allowed to escape to the ambient on the right.

The fins may extend from the left and right outer surfaces (e.g., the faces 104-1, 104-2) of the gear reducer housing (e.g., the housing 104). The fins may be oriented parallel to the flow of air (e.g., in the direction A). The fins may have a rectangular, trapezoidal, or triangular shape. The width of the fins may increase going from left to right as shown in FIG. 2. Stationary fins on the front face of the housing may be utilized to direct the airflow for higher shaft speeds. A mechanically and thermally feasible fin material may be aluminum. The fins may be bonded to the outside of the housing using a suitable thermal coupling layer or be cast as part of the housing.

The present disclosure may provide a cooling system (e.g., the cooling system 120) for an industrial speed reducer (e.g., the gear reducer 102) or another suitable device in another suitable application. In some embodiments, the speed reducer may utilize dip or splash lubrication. Advancements in metallurgy, surface finishing, and lubricants may be associated with very high power and torque densities, and gear reducers may be limited to a greater degree by lubricant temperatures than mechanical stresses. Heat buildup in the gear reducer may be the result of frictional and oil churning losses at the gears, shaft seals, and bearings. Add-on cooling systems may be available for gear reducers to improve the thermal power ratings. Depending on customer site and heat transfer requirements, these cooling systems may include shaft-mounted fans and oil-air or oil-water/water-air heat exchangers with fluid pumps. Cooling a reducer may require additional floor space, plumbing, and wiring efforts at a customer site.

According to the teachings of the present disclosure, a cooling system may be integrated with a transmission without the need for external electrical power, water supply, and/or fluid pumps. The present disclosure advantageously envisions a shaft-mounted axial and/or radial flow fan (e.g., the fan 124) that may double also as a heat exchanger (e.g., the heat exchanger 122) to dissipate heat generated in a high-speed pinion bearing (e.g., the bearing 130). The flow from the fan may be channeled across a set of extended surfaces (e.g., the fins 234) by a shroud (e.g., the shroud 132). The shroud may be formed to accelerate and expand the airflow over the fins for maximum heat transfer by forced convection.

In one respect, the present disclosure envisions a shaft-mounted heat exchanger to induce radial air flow and extended surfaces to dissipate heat from the high speed pinion bearing. In another respect, the present disclosure envisions an injection-molded or sheet metal shroud to accelerate and expand airflow across fins with increasing cross-sectional area.

According to one aspect of the present disclosure, a transmission may include a housing, an input shaft, and a cooling unit. The input shaft may extend outside of the housing and be configured to receive rotational power from a rotational power source. The cooling unit may be supported by the input shaft and may include a heat exchanger configured to dissipate heat generated by at least one heat source coupled to the input shaft in use of the transmission. The heat exchanger may further be configured for rotation about an axis defined by the input shaft to draw air into the transmission in use thereof.

In some embodiments, the heat exchanger may include a central hub configured for rotation about the axis and a plurality of blades extending outwardly from the central hub, each of the plurality of blades may have a planar shape and extend in a radial direction away from the axis, and the plurality of blades may be oriented in the radial direction to facilitate movement of air in the radial direction during both clockwise and counterclockwise rotation of the central hub about the axis in use of the transmission.

In some embodiments, each of the plurality of blades may extend in the radial direction away from the axis without twisting.

In some embodiments, the central hub may be coupled to the input shaft to minimize thermal contact resistance between the central hub and the input shaft, and the heat exchanger may be formed from one or more materials having a relatively-high thermal conductivity to facilitate dissipation of heat generated by a component that is supported by the input shaft.

In some embodiments, the heat exchanger may be formed from a cast aluminum alloy.

In some embodiments, the heat exchanger may be formed from one of the following: a 195 series cast aluminum alloy, a 319 series cast aluminum alloy, and a 356 series cast aluminum alloy.

In some embodiments, the heat exchanger may be formed from a cast copper-zinc alloy.

In some embodiments, the component may be a bearing, the central hub may be coupled to the input shaft by the bearing, and the bearing may be formed from an aluminum alloy and have at least one anodized surface.

In some embodiments, the component may be a bearing, the central hub may be coupled to the input shaft by the bearing, and the bearing may include at least one surface treated with thermally conductive grease.

In some embodiments, the cooling unit may include a shroud extending around the heat exchanger and the housing that is shaped to conduct air across the housing in use of the transmission.

In some embodiments, the transmission may include a plurality of components arranged in the housing that are configured to cooperatively transmit rotational power between the input shaft and an output shaft of the transmission to reduce a rotational speed of the output shaft relative to a rotational speed of the input shaft in use of the transmission. In such embodiments, the housing may define a sump configured to store lubricating fluid in use of the transmission, at least one of the plurality of components may be supplied with lubricating fluid stored by the sump in use of the transmission, and the heat exchanger may be configured to dissipate heat generated by the plurality of components during operation thereof to cool the lubricating fluid stored by the sump in use of the transmission.

According to another aspect of the present disclosure, a transmission may include a housing, an input shaft, and a cooling unit. The input shaft may extend outside of the housing and be configured to receive rotational power from a rotational power source. The cooling unit may be coupled to the input shaft and include a heat exchanger and a shroud extending around the heat exchanger and the housing. The heat exchanger may be configured to dissipate heat generated by at least one heat source coupled to the input shaft in use of the transmission, and the heat exchanger may be further configured for rotation about an axis defined by the input shaft to move air in a radial direction away from the axis. The shroud may be shaped to redirect air moved in the radial direction by the heat exchanger in an axial direction toward a plurality of fins extending outward from the housing to facilitate dissipation of heat generated by the at least one heat source in use of the transmission.

In some embodiments, the plurality of fins may include a first column of fins and a second column of fins arranged axially aft of the first column of fins.

In some embodiments, each fin of the first column of fins may extend from a first end to a second end arranged axially aft of the first end, each fin of the first column of fins may have a first width adjacent the first end and a second width adjacent the second end, and the first width may be smaller than the second width.

In some embodiments, each fin of the second column of fins may extend from a first end to a second end arranged axially aft of the first end, each fin of the second column of fins may have a first width adjacent the first end and a second width adjacent the second end, and the first width may be equal to the second width.

In some embodiments, the second width of each fin of the first column of fins may be about equal to the first width of each fin of the second column of fins.

In some embodiments, the heat exchanger may include a central hub configured for rotation about the axis and a plurality of blades extending outwardly from the central hub, each of the plurality of blades may have a planar shape and extend in a radial direction away from the axis, and the plurality of blades may be oriented in the radial direction to facilitate movement of air in the radial direction during both clockwise and counterclockwise rotation of the central hub about the axis in use of the transmission.

In some embodiments, each of the plurality of blades may extend in the radial direction away from the axis without twisting.

In some embodiments, the central hub may be coupled to the input shaft to minimize thermal contact resistance between the central hub and the input shaft, and the heat exchanger may be formed from one or more materials having a relatively-high thermal conductivity to facilitate dissipation of heat generated by a component that is supported by the input shaft.

In some embodiments, the heat exchanger may be formed from a cast aluminum alloy.

In some embodiments, the heat exchanger may be formed from a cast copper-zinc alloy.

In some embodiments, the transmission may include a plurality of components arranged in the housing that are configured to cooperatively transmit rotational power between the input shaft and an output shaft of the transmission to reduce a rotational speed of the output shaft relative to a rotational speed of the input shaft in use of the transmission. In such embodiments, the housing may define a sump configured to store lubricating fluid in use of the transmission, at least one of the plurality of components may be supplied with lubricating fluid stored by the sump in use of the transmission, and the heat exchanger may be configured to dissipate heat generated by the plurality of components during operation thereof to cool the lubricating fluid stored by the sump in use of the transmission.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A transmission comprising:
a housing;
an input shaft extending outside of the housing that is configured to receive rotational power from a rotational power source; and
a cooling unit supported by the input shaft, the cooling unit including a heat exchanger configured to dissipate heat generated by at least one heat source coupled to the input shaft in use of the transmission, the heat exchanger further configured for rotation about an axis defined by the input shaft to draw air into the transmission in use thereof, wherein the heat exchanger includes a central hub and a plurality of blades extending outwardly from the central hub for rotation about the axis, wherein the central hub is coupled to the input shaft by a bearing formed from an aluminum alloy and has at least one anodized surface to minimize thermal contact resistance between the central hub and the input shaft.

2. The transmission of claim 1, wherein:
each of the plurality of blades has a planar shape and extends in a radial direction away from the axis; and
the plurality of blades are oriented in the radial direction to facilitate movement of air in the radial direction during both clockwise and counterclockwise rotation of the central hub about the axis in use of the transmission.

3. The transmission of claim 2, wherein each of the plurality of blades extends in the radial direction away from the axis without twisting.

4. The transmission of claim 2, wherein the heat exchanger is
formed from one or more materials having a thermal conductivity to facilitate dissipation of heat generated by the bearing.

5. The transmission of claim 4, wherein the heat exchanger is formed from a cast aluminum alloy.

6. The transmission of claim 5, wherein the heat exchanger is formed from one of the following: a 195 series cast aluminum alloy, a 319 series cast aluminum alloy, and a 356 series cast aluminum alloy.

7. The transmission of claim 4, wherein the heat exchanger is formed from a cast copper-zinc alloy.

8. The transmission of claim 1, wherein the cooling unit includes a shroud
extending around the heat exchanger and the housing that is shaped to conduct air across the
housing in use of the transmission.

9. The transmission of claim 1, further comprising a plurality of components
arranged in the housing that are configured to cooperatively transmit rotational power between the input shaft and an output shaft of the transmission to reduce a rotational speed of the output shaft relative to a rotational speed of the input shaft in use of the transmission, wherein:
the housing defines a sump configured to store lubricating fluid in use of the transmission;
at least one of the plurality of components is supplied with lubricating fluid stored by the sump in use of the transmission; and
the heat exchanger is configured to dissipate heat generated by the plurality of components during operation thereof to cool the lubricating fluid stored by the sump in use of the transmission.

10. A transmission comprising:
a housing;
an input shaft extending outside of the housing that is configured to receive rotational power from a rotational power source; and
a cooling unit supported by the input shaft, the cooling unit including a heat exchanger configured to dissipate heat generated by at least one heat source coupled to the input shaft in use of the transmission, the heat exchanger further configured for rotation about an axis defined by the input shaft to draw air into the transmission in use thereof, wherein the heat exchanger includes a central hub and a plurality of blades extending outwardly from the central hub for rotation about the axis, wherein the central hub is coupled to the input shaft by a bearing that includes at least one surface treated with thermally conductive grease to minimize thermal contact resistance between the central hub and the input shaft.

11. The transmission of claim 10, further comprising:
a shroud extending around the heat exchanger and the housing, the heat exchanger configured to move air in a radial direction away from the axis, the shroud shaped to redirect air moved in the radial direction by the heat exchanger in an axial direction toward a plurality of fins extending outward from the housing to facilitate dissipation of heat generated by the at least one heat source in use of the transmission, wherein:
the plurality of fins includes a first column of fins and a second column of fins arranged aft of the first column of fins in the axial direction of flow of the redirected air;
each fin of the first column of fins extends from a first end to a second end arranged aft of the first end in the axial direction of flow of the redirected air; and
each fin of the first column of fins has a width that increases from a first width at the first end to a second width at the second end.

12. The transmission of claim 11, wherein:
each fin of the second column of fins extends from a first end to a second end arranged axially aft of the first end;
each fin of the second column of fins has a first width adjacent the first end and a second width adjacent the second end; and
the first width is equal to the second width.

13. The transmission of claim 12, wherein the second width of each fin of the first column of fins is about equal to the first width of each fin of the second column of fins.

14. The transmission of claim 11, wherein:
the heat exchanger includes a central hub configured for rotation about the axis and a plurality of blades extending outwardly from the central hub;
each of the plurality of blades has a planar shape and extends in a radial direction away from the axis; and
the plurality of blades are oriented in the radial direction to facilitate movement of air in the radial direction during both clockwise and counterclockwise rotation of the central hub about the axis in use of the transmission.

15. The transmission of claim 14, wherein each of the plurality of blades extends in the radial direction away from the axis without twisting.

16. The transmission of claim 15, wherein the central hub is coupled to the input shaft to minimize thermal contact resistance between the central hub and the input shaft, and wherein the heat exchanger is formed from one or more materials having a thermal conductivity to facilitate dissipation of heat generated by a component that is supported by the input shaft.

17. The transmission of claim 16, wherein the heat exchanger is formed from a cast aluminum alloy.

18. The transmission of claim 16, wherein the heat exchanger is formed from a cast copper-zinc alloy.

19. The transmission of claim 11, further comprising a plurality of components
arranged in the housing that are configured to cooperatively transmit rotational power between the input shaft and an output shaft of the transmission to reduce a rotational speed of the output shaft relative to a rotational speed of the input shaft in use of the transmission, wherein:
the housing defines a sump configured to store lubricating fluid in use of the transmission;
at least one of the plurality of components is supplied with lubricating fluid stored by the sump in use of the transmission; and
the heat exchanger is configured to dissipate heat generated by the plurality of components during operation thereof to cool the lubricating fluid stored by the sump in use of the transmission.

* * * * *